(12) United States Patent
Volokh

(10) Patent No.: US 6,742,968 B1
(45) Date of Patent: Jun. 1, 2004

(54) MILLING CUTTER

(75) Inventor: Vladimir Volokh, Maalot (IL)

(73) Assignee: Kennamtal Inc., Latrobe, PA (US)

( * ) Notice: Subject to any disclaimer, the term of this patent is extended or adjusted under 35 U.S.C. 154(b) by 0 days.

(21) Appl. No.: 09/563,567

(22) Filed: May 3, 2000

(30) Foreign Application Priority Data

Jul. 26, 1999 (IL) ................................. 131119

(51) Int. Cl.$^7$ .............................. B23C 5/10; B26D 1/12
(52) U.S. Cl. ............................. 407/34; 407/54; 407/57
(58) Field of Search ......................... 407/34, 53, 54, 407/56, 57, 58, 59

(56) References Cited

U.S. PATENT DOCUMENTS

| | | | |
|---|---|---|---|
| 1,702,812 A | | 2/1929 | Cochran |
| 2,113,178 A | * | 4/1938 | Gase .......................... 407/54 |
| 2,411,209 A | * | 11/1946 | Hall et al. ................. 407/56 X |
| 4,285,618 A | * | 8/1981 | Shanley, Jr. ................. 407/54 |
| 4,470,733 A | * | 9/1984 | Marques, Jr. ............... 408/230 |
| 4,893,968 A | * | 1/1990 | Levy ............................ 407/54 |
| 5,188,488 A | * | 2/1993 | Nakayama et al. ........... 407/54 |
| 6,164,876 A | * | 12/2000 | Cordovano .................. 407/59 |
| 6,315,505 B1 | * | 11/2001 | Moore ........................ 408/199 |

FOREIGN PATENT DOCUMENTS

| | | |
|---|---|---|
| CH | 675842 | 11/1990 |
| DE | 4117486 | 12/1992 |
| EP | 0893185 | 1/1999 |

OTHER PUBLICATIONS

Search Report dated Mar. 24, 2002, Issued in European Application No. EP 00 11 3152.

* cited by examiner

Primary Examiner—Henry W. H. Tsai
(74) Attorney, Agent, or Firm—Larry R. Meenan

(57) ABSTRACT

A milling cutter comprising at least one cutting end and a cutter shank. The at least one cutting end including a core of cutter material having a cutter axis. The core includes a plurality of cutting edges extending therefrom, wherein the total cross-sectional area of the cutter material, taken at right angles to the cutter axis, increases gradually from the cutting end towards the cutter shank.

18 Claims, 2 Drawing Sheets

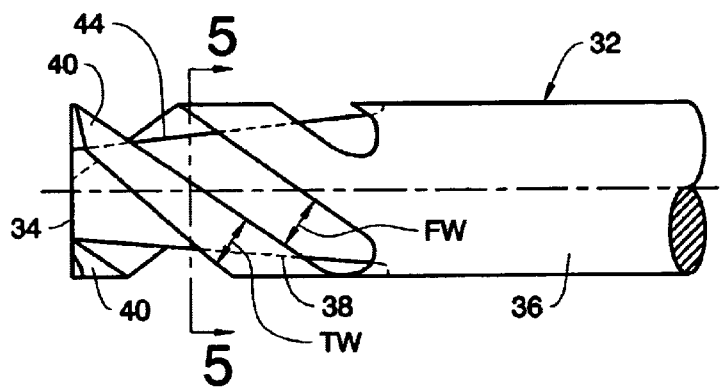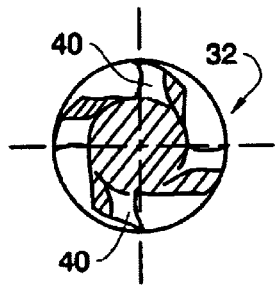
FIG. 4　　　FIG. 5
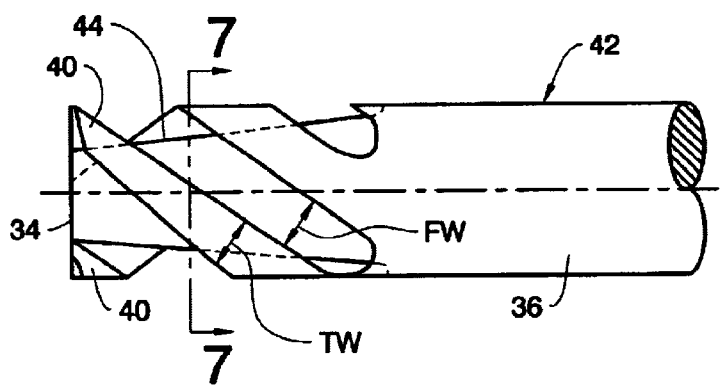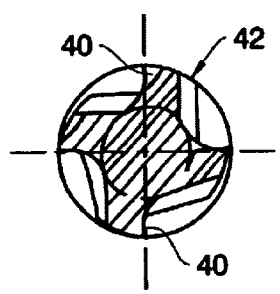
FIG. 6　　　FIG. 7

MILLING CUTTER

The present invention relates to a milling cutter.

More particularly, the invention provides new forms for end mills cores, to produce a tool of improved stiffness having more versatile applications.

Milling cutters are rotatable tools of cylindrical, conical, shaped or disk form, having a plurality of cutting edges. Such cutters are available in many forms, such as plain cylindrical, side milling cutters, face and end mills, formed cutters, and standard and special shaped profile cutters. High speed steel cutters are used for short production runs, inserted carbide blades are often used for long runs.

The end mill is a simple cutter, often of cylindrical shape, wherein one end of the circumferential surface has spiral cutting teeth and the other end is blank to serve as a shank, except if the cutter is double ended, in which case the central portion is gripped by the machine. Teeth are also provided at the cylinder end face. Four flute mills are probably the most common, but 2, 3 or 6 flutes are also used extensively. End mills are in much used because they can execute a wide variety of milling operations, and the first cost of the cutter is moderate. Shapes other than cylindrical are also in common use. The shank can be parallel or tapered, and need not necessarily be equal to the cutter teeth diameter.

Much research has been carried out to determine the largest possible volume of metal removed before tool failure, in relation to a chosen cutting speed. There are however so many factors involved, such as workpiece machinability rating, which itself is a function of both material type and heat treatment, tooth form, cutter size, number of teeth and cutter material, machine tool power available at the cutter and machine tool rigidity, cutter rigidity, coolant type and flow rate, surface finish required, feed rate chosen, and depth and width of cut that results published for one application are difficult to relate to other applications even where the basic type of work, e.g. face milling, is the same.

Recent examples of attempted improvements in milling cutters, particularly end mills, are found in U.S. Pat. No. 5,779,399 to Kuberski and U.S. Pat. No. 5,810,517 to Bostic. These documents reference many earlier designs.

In the design of an end mill, the total diameter must be allocated between the tooth depth on both sides of the core and the remaining core diameter. A large core diameter will provide the advantage of a rigid tool. However, extended tooth depth will encourage good chip clearance and improve lubricant access to the cutting edge. Clearly, an appropriate balance between these two conflicting demands must be found, preferably on the basis of the anticipated usage of the tool. The present inventors offer the following ratios as being best for corresponding milling tasks:

| Operation | Core diameter relative to Outside diameter | Remarks |
| --- | --- | --- |
| Slotting | 50–65%, depending on workpiece material | 2 or 3 cutter teeth |
| Roughing side milling | 55–70% | 4 teeth |
| Finish side milling | 65–75% | 4–6 teeth, short cuts |
| Deep, finish side milling | 75–85% | 5–8 teeth |
| Long cuts, max. rigidity | 75–85% | |

The above table shows that when changing the type of milling operation being carried out, for example when a workpiece is to be slotted after its sides have been finish machined, the milling cutter should be changed too. Not only does this situation waste time in the machine shop, but a large stock of different end mills needs to be available if optimum machining results are to be obtained.

Usually when an end mill is in operation the machining force is exerted against one edge of the cutter. The resulting moment is resisted by the tool holder which rigidly grips the cutter shank. Ignoring the fact that the direction of the moment changes continually as the cutter revolves, the cutter can be considered to be stressed as a cantilever. For simplicity, the load can be considered to be a point load. The bending stress on the cantilever is:

$$W/Z\ (l-x)$$

where
  $W$=load
  $Z$=section modulus
  $l$=distance between the tool holder jaw end and the load, and
  $x$=distance between the tool holder jaw end and the point at which stress is to be measured.

Clearly, bending moment increases exponentially as x increases. A constant diameter core, prevalent on prior-art endmills, is therefore not the best way of allocating the limited available space in the design of an end mill.

Two notes need to be added to the above remarks.
1. The actual stress on any beam also includes shear stress, but as shear stress is constant over the considered beam section, it is here ignored.
2. The cutter section, and therefor Z, is not constant, being reduced by the tooth flutes and being full along the shank. Tooth flutes terminate in a slope or curve to prevent stress concentration.

While the matter of stress discussed above is related to avoiding tool breakage, no less important is the requirement to minimize tool deflection, in order to improve accuracy and surface finish and to reduce vibration and noise. A constant diameter core results in more tool deflection than necessary, because the high bending moment close to the tool holder, and also near the ends of the tooth flutes nearest the cutter shank, results in bending of the cutter as a result of machining forces. The resultant cutter deflection at the cutting edge would be reduced if the tool steel comprising the cutter core were distributed in a better manner, that is more metal were allocated to the sections under greater stress, at the expense of the more lightly stressed toothed end of the cutter.

It is therefore one of the objects of the present invention to obviate the disadvantages of prior art end mills and to provide a cutter which offers improved stiffness while yet allowing adequate tooth depth for chip clearance.

The present invention achieves the above object by providing a rotary multi-tooth end milling cutter wherein the total cross-sectional area of the cutter material increases gradually from the cutting end towards the cutter shank.

In a preferred embodiment of the present invention there is provided an end milling cutter wherein in a central cross-section along the length of said cutter the cutter core gradually increases in diameter from the cutting end towards the cutter shank.

In a most preferred embodiment of the present invention there is provided a cutter wherein tooth width increases gradually from the cutting end towards the cutter shank.

Yet further embodiments of the invention will be described hereinafter.

In U.S. Pat. No. 5,452,971 there is described and claimed by Nevills a rotary end cutting tool of great complexity, one of its many special features being "a tapered residual core area." The tool is however a drill, as evidenced by the description and diagrams. In particular, the core area is much smaller than found on end mills and the end of the tool is shaped for penetrating the workpiece by axial pressure to produce or enlarge a hole.

In contradistinction thereto, the present invention relates to end mills which have a substantial core and have side teeth intended for machining flat or curved surfaces.

It will thus be realized that the novel endmill of the present invention serves to provide sufficient stiffness to allow operation on slotting, surface roughing and finishing without needing to change over the cutter. As a result, the cutter produces better quality surfaces, is more resistant to breakage, and less liable to vibration and generating noise. At the same time, adequate tooth depth is provided where most needed, that is near the cutting end of the mill, to allow coolant access to the cutting area and to clear away the generated chips.

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the Drawings:

FIG. 4 is an elevational view of an embodiment having increasing width teeth;

FIG. 5 is a cross-sectional view of FIG. 4 taken at BB;

FIG. 6 is the same as FIG. 4, except for showing a concave parabolic core; and

FIG. 7 is a cross-sectional view of FIG. 6 taken at CC.

Figure 1:
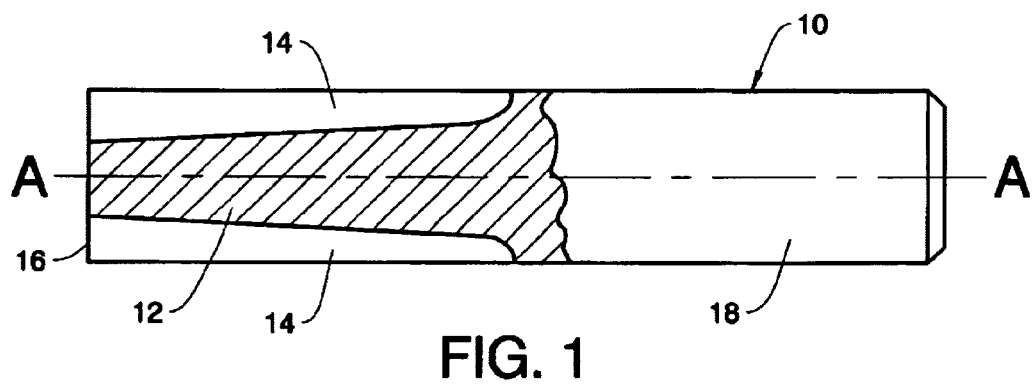
FIG. 1 is a partially-sectioned elevational view of a preferred embodiment of the end mill cutter according to the invention.

There is seen in FIG. 1 a rotary multi-tooth end milling cutter 10.

Considering both the core 12 and the teeth 14 of the cutter, the total cross-sectional area of the cutter material, taken at right angles to the cutter axis AA, increases gradually from the cutting end 16 towards the cutter shank 18.

In the present embodiment the increasing cross-sectional area is due to an increase in core diameter. Core diameter is the solid center of the cutter defining the roots of the tooth flutes.

In the present embodiment the cutter core 12, as seen in the diagram in a section taken along the cutter axis AA, is straight tapered. Such form is of course the easiest to manufacture, and serves to provide high strength and stiffness nearer the shank 18 and adequate tooth depth near the cutting end 16. The cutter can therefor be used on different types of machining operations.

With reference to the rest of the figures, similar reference numerals have been used to identify similar parts.

Figure 2:
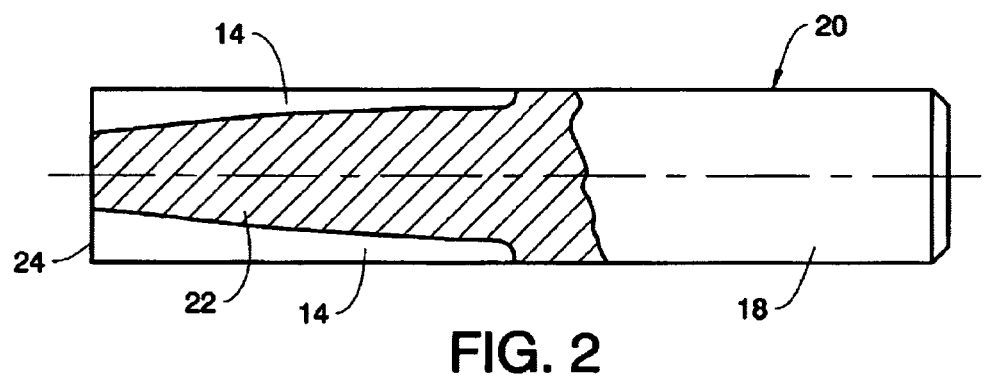
FIGS. 2 & 3 are also partially-sectioned elevational views of further embodiments.

Referring now to FIG. 2, there is seen a similar milling cutter 20 as 10 shown in FIG. 1. In the present embodiment the cutter core 22 has a convex taper of parabolic form. This shape provides extra stiffness while maintaining sufficient tooth depth at the cutting end 24. This embodiment provides the best stiffness against bending, and is usefully employed where slotting milling is confined to the areas proximate to the cutting end 24. Furthermore, this embodiment is adapted to perform in best manner side milling and light slotting operations.

Figure 3:
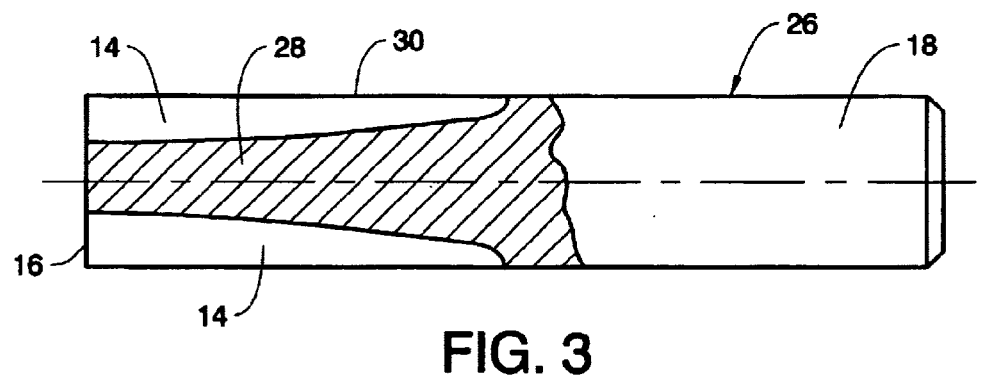

FIG. 3 illustrates an end milling cutter 26 wherein the cutter core 28 has a concave taper. Advantageously, the concave taper is of parabolic form. Such form corresponds well to the stress diagram of a loaded cantilever, thus allocating the core metal precisely where it is most needed and obtaining good tooth depth for an extended length along the cutter. This shape provides best chip clearance along the side 30 of the cutter, and is therefore ideal for side milling, and slotting operations.

Seen in FIGS. 4 & 5, is an end milling cutter 32 wherein tooth width TW increases, and flute width FW decreases, gradually from the cutting end 34 towards the cutter shank 36.The core form 38 is straight tapered, as illustrated in FIG. 1. However the core taper is somewhat shallower, as the desired increase in area when moving towards the shank is partly accounted for by the cutter teeth 40. The present embodiment is applicable to deep slotting and side milling operations.

FIGS. 6 and 7 show an end milling cutter 42 identical with that shown in FIGS. 4 and 5, except that the core form 44 is parabolic convex or concave for reasons explained with reference to FIGS. 2 and 3.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

What is claimed is:

1. A rotary multi-tooth end milling cutter including a cutting end of a cylindrical shape having a plurality of spiral cutting teeth defined by flutes about a cutter core and a cutter shank wherein the outside diameter of the cutting end remains constant along the length of the cutting end and the total cross-sectional area of the cutter core increases gradually from the cutting end towards the cutter shank and the plurality of spiral cutting teeth width increases gradually from the cutting end towards the cutter shank.

2. The end milling cutter as claimed in claim 1, wherein in a central cross-section along the length of said cutter the cutter core gradually increases in diameter from the cutting end towards the cutter shank.

3. The end milling cutter as claimed in claim 2, wherein said cutter core is straight tapered.

4. The end milling cutter as claimed in claim 2, wherein said cutter core has a convex taper.

5. The end milling cutter as claimed in claim 2, wherein said cutter core has a concave taper.

6. The end milling cutter as claimed in claim 4, wherein said convex taper is of parabolic form.

7. The end milling cutter as claimed in claim 5, wherein said concave taper is of parabolic form.

8. The end milling cutter as claimed in claim 5, wherein said concave taper is of parabolic form.

9. The end milling cutter as claimed in claim 1, wherein tooth width increases gradually from the cutting end towards the cutter shank.

10. A milling cutter comprising at least one cutting end and a cutter shank, the at least one cutting end including a core of cutter material having a cutter axis, the core having a plurality of cutting edges extending therefrom, wherein the total cross-sectional area of the cutter material, tin at right angles to the cutter axis, increases gradually from the cutting end towards the cutter shank and wherein the outside diameter of the cutting end remains constant along the length of the cutting end and the plurality of spiral cutting teeth width increases gradually from the cutting end towards the cutter shank.

11. The milling cutter as claimed in claim 10 wherein the cutter core is straight tapered.

12. The milling cutter as claimed in claim 10 wherein the cutter core has a convex taper of parabolic form.

13. The milling cutter as claimed in claim 10 wherein the cutter core has a concave taper.

14. The milling cutter as claimed in claim 13 wherein the concave taper is of parabolic form.

15. The milling cutter as claimed in claim 10 wherein the plurality of cutting edges are defined by spiral cutting teeth.

16. A milling cutter comprising at least one cutting end and a cutter shank, the at least one cutting end including a core of cutter material having a cutter axis, a plurality of axially extending flutes on the cutting end, each of the flutes defining a wall having a curved section, a flat section tangent to said curved section and a plurality of cutting teeth defined by the intersection of the curved sections with an end surface of the cutting end wherein cutting teeth width increases, and flute width decreases, from the cutting end towards the cutter shank and wherein the outside diameter of the cutting end remains constant along the length of the cutting end.

17. The milling cutter as claimed in claim 16 wherein the core is straight tapered.

18. The milling cutter as claimed in claim 16 wherein the core is parabolic convex or concave.

* * * * *